(12) United States Patent
Noborio et al.

(10) Patent No.: US 10,266,226 B2
(45) Date of Patent: Apr. 23, 2019

(54) DISC BRAKE CALIPER AND DISC BRAKE CALIPER ASSEMBLY

(71) Applicant: SHIMANO INC., Sakai (JP)

(72) Inventors: Daisuke Noborio, Sakai (JP); Tsutomu Muraoka, Sakai (JP); Osamu Kariyama, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 16 days.

(21) Appl. No.: 15/339,858

(22) Filed: Oct. 31, 2016

(65) Prior Publication Data
US 2017/0043839 A1 Feb. 16, 2017

Related U.S. Application Data

(63) Continuation of application No. 14/284,343, filed on May 21, 2014, now Pat. No. 9,533,733, which is a
(Continued)

(51) Int. Cl.
*B62L 1/00* (2006.01)
*B62L 3/02* (2006.01)
(Continued)

(52) U.S. Cl.
CPC .............. *B62L 1/005* (2013.01); *B62L 3/023* (2013.01); *F16D 55/228* (2013.01); *F16D 65/0068* (2013.01); *F16D 2055/0016* (2013.01)

(58) Field of Classification Search
CPC .. B62L 1/005; B62L 1/00; B62L 3/023; F16D 55/228; F16D 65/0068; F16D 65/18; F16D 2055/0016; B62K 23/06
(Continued)

(56) References Cited

U.S. PATENT DOCUMENTS 4,215,768 A 8/1980 Seki
6,230,849 B1 5/2001 Lumpkin
(Continued)

FOREIGN PATENT DOCUMENTS

CN 2616465 Y 5/2004
CN 1854014 11/2006
(Continued)

OTHER PUBLICATIONS

Office Action with Form PTO-892 Notice of References Cited issued by the U.S. Patent and Trademark Office for the U.S. Appl. No. 13/931,027, dated May 4, 2015.
(Continued)

*Primary Examiner* — Pamela Rodriguez
(74) *Attorney, Agent, or Firm* — Mori & Ward, LLP

(57) ABSTRACT

A disc brake caliper for applying a braking force on a brake disc rotor configured to be rotatable about a rotational axis. The disc brake caliper comprises an attachment surface and a first threaded hole. The attachment surface is configured to face a pipe portion of a bicycle frame in a state where the disc brake caliper is coupled to the bicycle frame. A first thread bolt is to be inserted in the first threaded hole so as to couple the disc brake caliper to one of the bicycle frame and a base member attached to the bicycle frame, the first threaded hole being provided on the attachment surface.

25 Claims, 13 Drawing Sheets

Related U.S. Application Data continuation-in-part of application No. 13/931,027, filed on Jun. 28, 2013, now Pat. No. 9,227,691.

(51) Int. Cl.
*F16D 55/00* (2006.01)
*F16D 65/00* (2006.01)
*F16D 55/228* (2006.01)

(58) Field of Classification Search
USPC .... 188/73.31, 71.1, 71.7, 72.4, 24.12, 24.11, 188/24.19, 24.22, 218 XL, 344, 26
See application file for complete search history.

(56) References Cited

U.S. PATENT DOCUMENTS

| | | | |
|---|---|---|---|
| 6,334,514 B1 | 1/2002 | Kirimoto et al. | |
| 6,390,246 B1 | 5/2002 | Lee | |
| 6,431,327 B2 | 8/2002 | Lumpkin | |
| 7,007,776 B1 | 3/2006 | Lin | |
| 7,478,707 B2 | 1/2009 | Choon et al. | |
| 8,479,897 B2 | 7/2013 | Yamashita et al. | |
| 8,936,136 B2 | 1/2015 | Thomas | |
| 9,227,691 B2 * | 1/2016 | Noborio | B62L 1/005 |
| 9,533,733 B2 * | 1/2017 | Noborio | B62L 1/005 |
| 9,908,585 B2 * | 3/2018 | Noborio | B62L 1/005 |
| 2003/0010580 A1 | 1/2003 | Nakamura | |
| 2004/0188186 A1 | 9/2004 | Chen | |
| 2005/0039989 A1 | 2/2005 | Huang | |
| 2006/0231351 A1 | 10/2006 | Kariyama | |
| 2007/0278055 A1 | 12/2007 | Chen | |
| 2013/0048444 A1 | 2/2013 | Hirotomi et al. | |
| 2015/0183488 A1 | 7/2015 | Hirotomi et al. | |
| 2015/0308524 A1 | 10/2015 | Nakakura | |

FOREIGN PATENT DOCUMENTS

| | | |
|---|---|---|
| CN | 201264697 Y | 7/2009 |
| DE | 60000637 T2 | 6/2003 |
| DE | 20 2004 003 799 U1 | 5/2004 |
| DE | 60312359 T2 | 12/2007 |
| DE | 10 2008 014 890 | 12/2008 |
| EP | 1714863 | 10/2006 |
| EP | 2444309 | 4/2012 |
| WO | WO 2005/123491 | 12/2005 |

OTHER PUBLICATIONS

Office Action with Form PTO-892 Notice of References Cited issued by the U.S. Patent and Trademark Office for the co-pending U.S. Appl. No. 14/284,343, dated Jan. 22, 2016.

Office Action issued by the U.S. Patent and Trademark Office for the co-pending U.S. Appl. No. 14/284,343, dated Jul. 6, 2016.

* cited by examiner

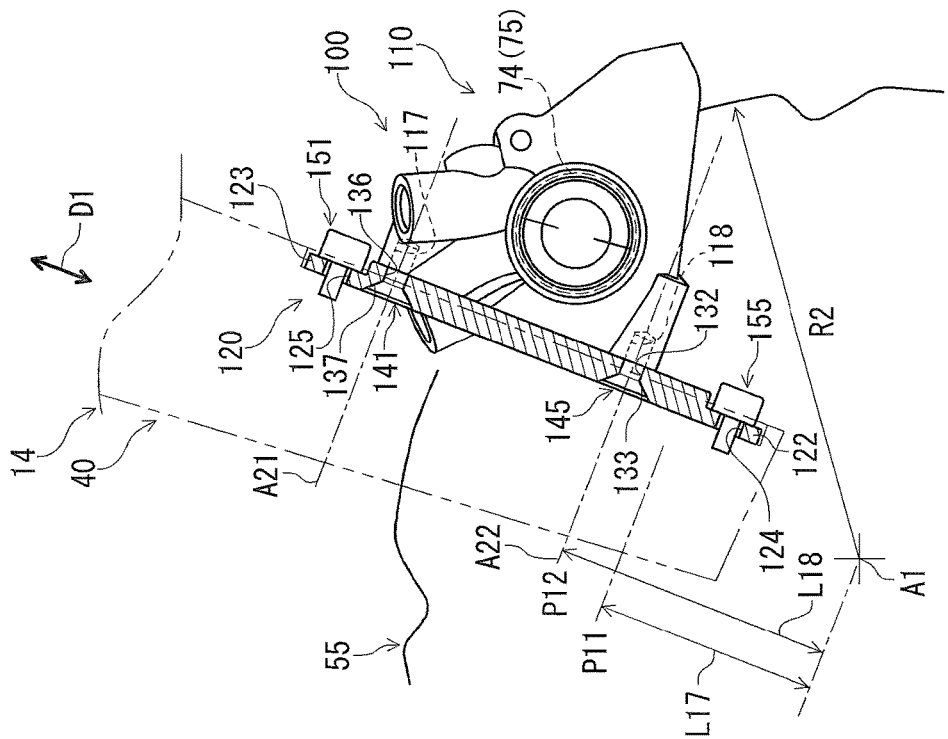
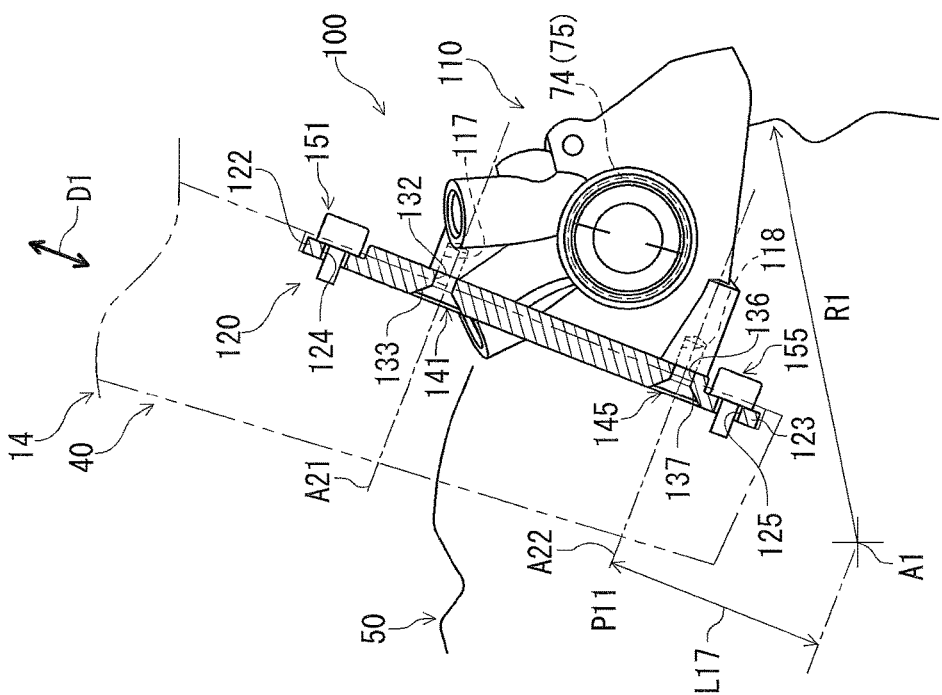
FIG. 8B
FIG. 8A

DISC BRAKE CALIPER AND DISC BRAKE CALIPER ASSEMBLY

CROSS-REFERENCE TO RELATED APPLICATIONS

The present application is a continuation application of the U.S. patent application Ser. No. 14/284,343 filed May 21, 2014 that issued as U.S. Pat. No. 9,533,733, which is a continuation-in-part application of the U.S. patent application Ser. No. 13/931,027 filed Jun. 28, 2013 that issued as U.S. Pat. No. 9,227,691. The contents of these applications are incorporated herein by reference in their entirety.

BACKGROUND OF THE INVENTION

Field of the Invention

The present invention relates to a disc brake caliper and a disc brake caliper assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle brake device. In particular, in recent years, bicycles have been provided with disc braking devices.

SUMMARY OF THE INVENTION

In accordance with a first aspect of the present invention, a disc brake caliper for applying a braking force on a brake disc rotor configured to be rotatable about a rotational axis. The disc brake caliper comprises an attachment surface and a first threaded hole. The attachment surface is configured to face a pipe portion of a bicycle frame in a state where the disc brake caliper is coupled to the bicycle frame. A first thread bolt is to be inserted in the first threaded hole so as to couple the disc brake caliper to one of the bicycle frame and a base member attached to the bicycle frame, the first threaded hole being provided on the attachment surface.

In accordance with a second aspect of the present invention, the disc brake caliper according to the first aspect is configured so that the first threaded hole has a first center axis which is non-parallel to the rotational axis in a state where the disc brake caliper is mounted to the bicycle frame.

In accordance with a third aspect of the present invention, the disc brake caliper according to the second aspect is configured so that the first center axis is parallel to a braking plane which is perpendicular to the rotational axis in a state where the disc brake caliper is mounted to the bicycle frame.

In accordance with a fourth aspect of the present invention, the disc brake caliper according to the first aspect further comprises a second threaded hole in which a second thread bolt is to be inserted so as to couple the disc brake caliper to one of the bicycle frame and the base member, the second threaded hole being provided on the attachment surface.

In accordance with a fifth aspect of the present invention, the disc brake caliper according to the fourth aspect is configured so that the attachment surface defines an end surface which faces the pipe portion of the bicycle frame.

In accordance with a sixth aspect of the present invention, the disc brake caliper according to the fourth aspect is configured so that the attachment surface comprises a single flat surface on which the first threaded hole and the second threaded hole are provided.

In accordance with a seventh aspect of the present invention, the disc brake caliper according to the fourth aspect is configured so that the attachment surface comprises a first portion and a second portion divided from the first portion. The first threaded hole is provided on the first portion of the attachment surface and the second threaded hole is provided on the second portion of the attachment surface.

In accordance with an eighth aspect of the present invention, the disc brake caliper according to the fourth aspect is configured so that the first threaded hole has a first inner diameter. The second threaded hole has a second inner diameter equal to the first inner diameter.

In accordance with a ninth aspect of the present invention, the disc brake caliper according to the fourth aspect is configured so that the first threaded hole has a first center axis which is non-parallel to the rotational axis in a state where the disc brake caliper is mounted to the pipe portion of the bicycle frame.

In accordance with a tenth aspect of the present invention, the disc brake caliper according to the ninth aspect is configured so that the first center axis is parallel to a braking plane which is perpendicular to the rotational axis in a state where the disc brake caliper is mounted to the bicycle frame.

In accordance with an eleventh aspect of the present invention, the disc brake caliper according to the tenth aspect is configured so that the second threaded hole has a second center axis parallel to the first center axis.

In accordance with a twelfth aspect of the present invention, the disc brake caliper according to the fourth aspect further comprises a first piston. The first threaded hole has a first center axis. The second threaded hole has a second center axis. The first piston is disposed between the first center axis and the second center axis.

In accordance with a thirteenth aspect of the present invention, the disc brake caliper according to the twelfth aspect further comprises a second piston disposed between the first center axis and the second center axis so as to at least partially face the first piston.

In accordance with a fourteenth aspect of the present invention, the disc brake caliper according to the thirteenth aspect is configured so that the first center axis is non-parallel to the rotational axis in a state where the disc brake caliper is mounted to the pipe portion of the bicycle frame.

In accordance with a fifteenth aspect of the present invention, the disc brake caliper according to the fourteenth aspect is configured so that the first center axis is parallel to a braking plane which is perpendicular to the rotational axis in a state where the disc brake caliper is mounted to the bicycle frame.

In accordance with a sixteenth aspect of the present invention, the disc brake caliper according to the fifteenth aspect is configured so that the second center axis is parallel to the first center axis.

In accordance with a seventeenth aspect of the present invention, a disc brake caliper comprises a first piston and a first threaded hole. The first piston is configured to be movable in a movement direction. A first thread bolt is to be inserted in the first threaded hole so as to couple the disc brake caliper to one of the bicycle frame and a base member attached to the bicycle frame. The first threaded hole has a first center axis non-parallel to the movement direction.

In accordance with an eighteenth aspect of the present invention, the disc brake caliper according to the seventeenth aspect is configured so that the first center axis is parallel to a braking plane which is perpendicular to the movement direction.

In accordance with a nineteenth aspect of the present invention, the disc brake caliper according to the seventeenth aspect further comprises a second threaded hole in which a second thread bolt is to be inserted so as to couple the disc brake caliper to one of the bicycle frame and the base member, the second threaded hole having a second center axis non-parallel to the movement direction.

In accordance with a twentieth aspect of the present invention, the disc brake caliper according to the nineteenth aspect is configured so that the first threaded hole has a first inner diameter. The second threaded hole has a second inner diameter equal to the first inner diameter.

In accordance with a twenty-first aspect of the present invention, the disc brake caliper according to the nineteenth aspect is configured so that the first piston is disposed between the first center axis and the second center axis.

In accordance with a twenty-second aspect of the present invention, the disc brake caliper according to the twenty-first aspect further comprises a second piston configured to be movable in the movement direction and disposed between the first center axis and the second center axis so as to at least partially face the first piston.

In accordance with a twenty-third aspect of the present invention, the disc brake caliper according to the twenty-second aspect is configured so that the first center axis is parallel to a braking plane which is perpendicular to the movement direction.

In accordance with a twenty-fourth aspect of the present invention, the disc brake caliper according to the twenty-third aspect is configured so that the second center axis is parallel to the first center axis.

In accordance with a twenty-fifth aspect of the present invention, a disc brake caliper assembly comprises the disc brake caliper according to any one of the first to twenty-fourth aspects, a base member, and a first thread bolt. The base member is configured to be coupled to the disc brake caliper and to be attached to the pipe portion of the bicycle frame. The first thread bolt is configured to be inserted to the first threaded hole via the base member so as to couple the base member to the disc brake caliper.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8A is an elevational view of the disc brake caliper assembly illustrated in FIG. 4 (first position);

FIG. 8B is an elevational view of the disc brake caliper assembly illustrated in FIG. 7 (second position);

DESCRIPTION OF THE EMBODIMENTS

Figure 1:
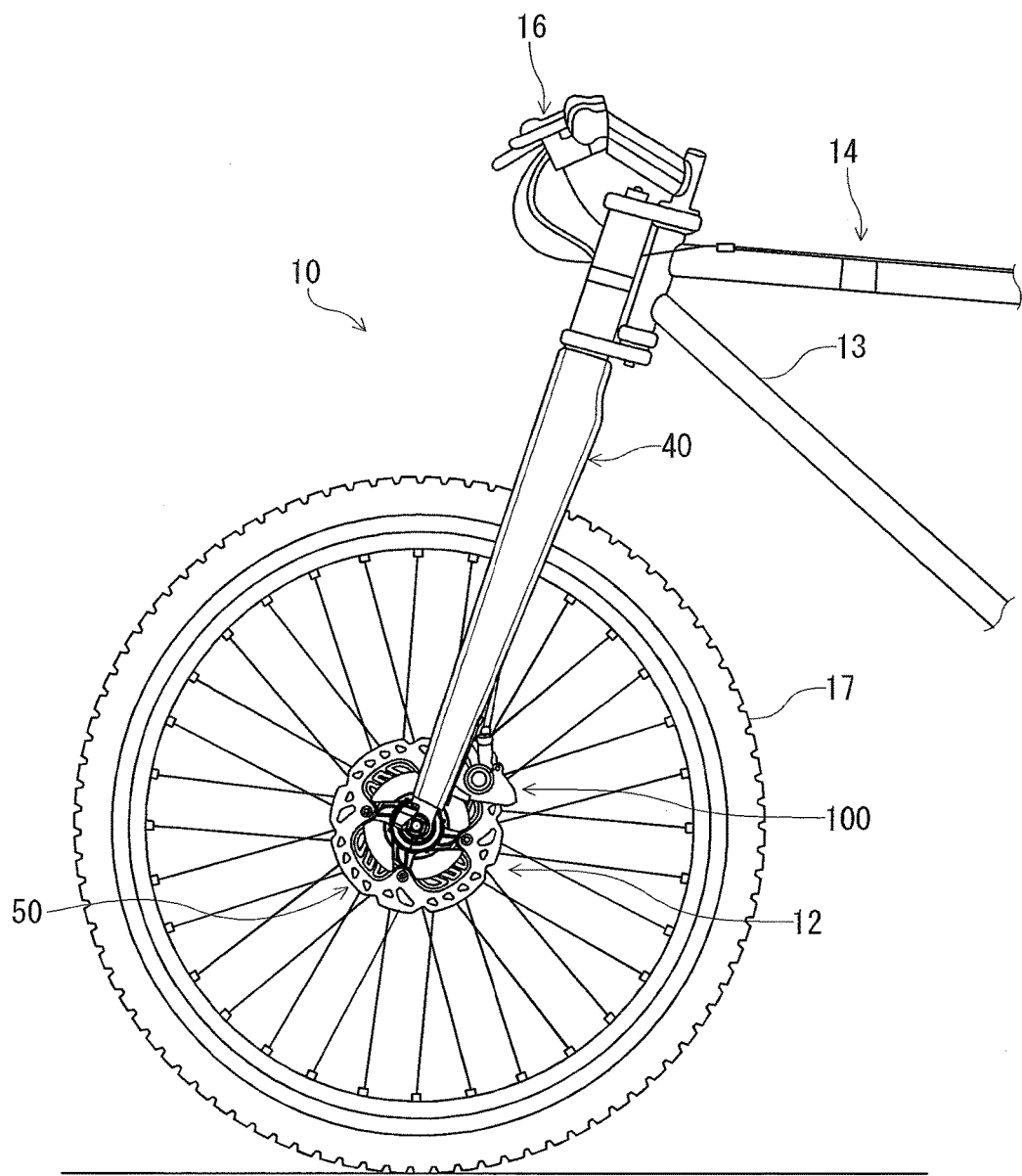
FIG. 1 is a left side elevational view of a front portion of a bicycle with a disc brake caliper assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 includes a bicycle frame 14, a front wheel 17, a rear wheel (not shown), a drive train (not shown), and a disc brake device 12. The bicycle frame 14 includes a main frame 13 and a pipe portion 40. In the illustrated embodiment, the pipe portion 40 is a part of a front fork. The pipe portion 40 can, however, be bicycle parts other than the front fork. The front wheel 17 is rotatably supported by the front fork. A handlebar 15 (FIG. 2) is attached to a front fork column by a stem. The rear wheel is rotatably supported by a rear end of the main frame 13. The disc brake device 12 includes a disc brake caliper assembly 100, a brake disc rotor 50, and a brake operating mechanism 16.

In the present application, the following directional terms "front", "rear", "forward", "rearward", "left", "right", "upward" and "downward" as well as any other similar directional terms refer to those directions which are determined on the basis of the rider who sits on a saddle (not shown) of a bicycle with facing the handlebar 15. Accordingly, these terms, as utilized to describe the disc brake caliper assembly 100 should be interpreted relative to a bicycle equipped with the disc brake caliper assembly 100 as used in an upright riding position on a horizontal surface.

Figure 2:
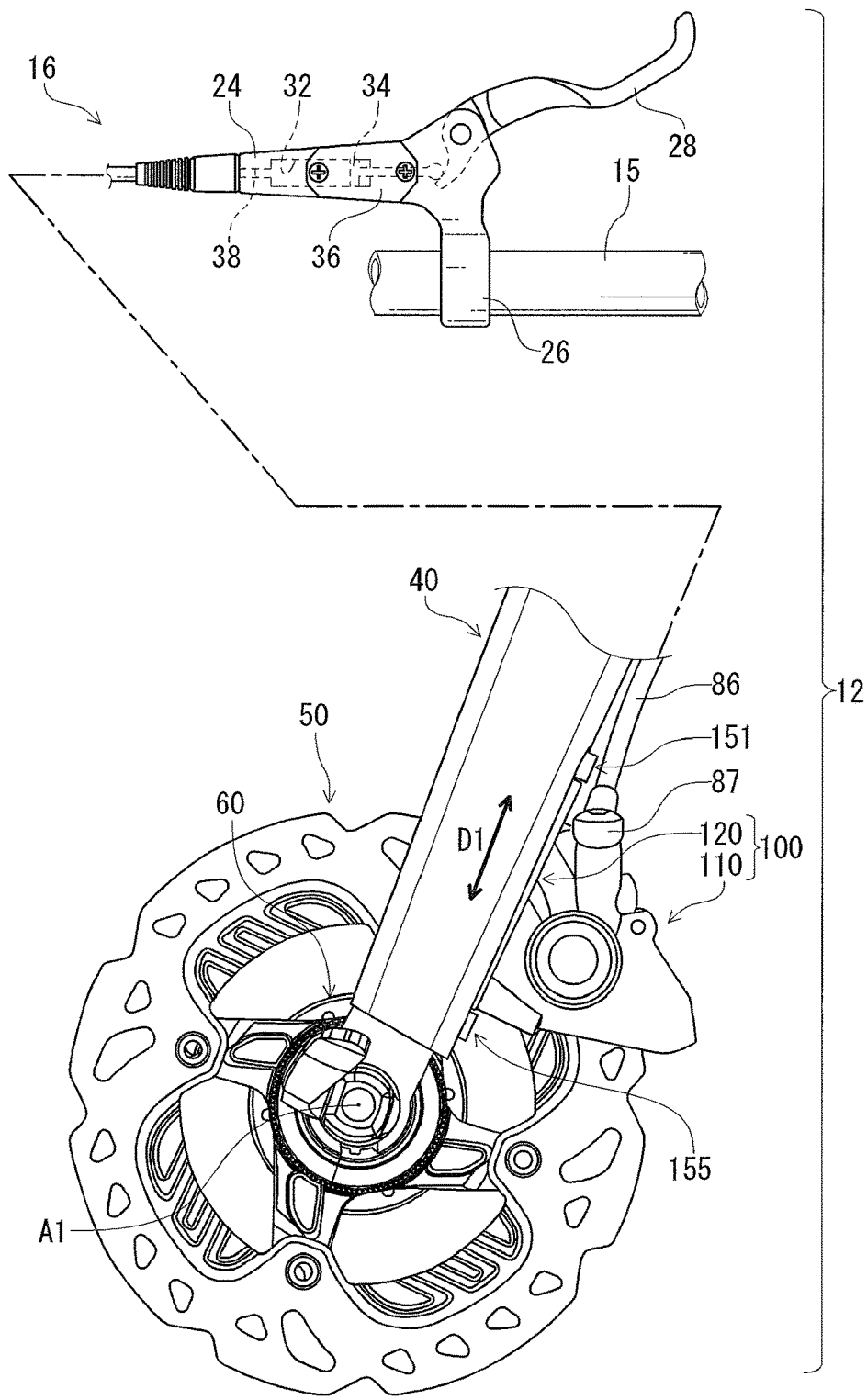
FIG. 2 is a partial side elevational view of a disc brake device with the disc brake caliper assembly in accordance with the first embodiment.

Referring to FIG. 2, the disc brake caliper assembly 100 is mounted to the pipe portion 40 of the bicycle frame 14. It should be understood that the disc brake caliper assembly 100 can be mounted to the main frame 13 for the rear wheel. The disc brake caliper assembly 100 comprises a disc brake caliper 110 and a base member 120. The disc brake caliper assembly 100 is also referred to as a bicycle brake caliper assembly 100 hereinafter. The disc brake caliper 110 is also referred to as a brake caliper 110 hereinafter. The brake caliper 110 is coupled to the base member 120. The base member 120 is attached to the pipe portion 40 by a first attaching member 151 and a second attaching member 155. The brake operating mechanism 16 is designed to actuate the bicycle brake caliper assembly 100 to apply a braking force on the brake disc rotor 50. The brake disc rotor 50 is mounted on a front hub shell 60 to be integrally rotatable with the front hub shell 60 and the front wheel 17 (FIG. 1) about a rotational axis A1. Brake disc rotors having different outer diameters can be mounted on the front hub shell 60. The bicycle brake caliper assembly 100 is so configured that relative position between the rotational axis A1 and the brake caliper 110 is adjustable in a radial direction D1 of the brake disc rotor 50.

As seen FIG. 2, the brake operating mechanism 16 includes a master cylinder 24, a master piston 34, a clamp 26, a brake lever 28, and a hydraulic fluid reservoir 36. The brake operating mechanism 16 is mounted on the handlebar 15 via the clamp 26. The master cylinder 24 includes a master cylinder bore 32 in which the master piston 34 is movably disposed. The brake lever 28 is pivotally coupled to the master cylinder 24 for operating the bicycle brake caliper assembly 100. The brake lever 28 is operatively coupled to the master piston 34 such that the master piston 34 is movable in the master cylinder bore 32 in response to the pivotal movement of the brake lever 28. The hydraulic fluid reservoir 36 is in fluid communication with the master cylinder bore 32. The master cylinder 24 and the hydraulic fluid reservoir 36 contain hydraulic fluid such as mineral oil. The master cylinder 24 has an outlet port 38 for supplying hydraulic fluid to the bicycle brake caliper assembly 100 via a hydraulic brake hose 86 and a banjo 87.

Figure 3:
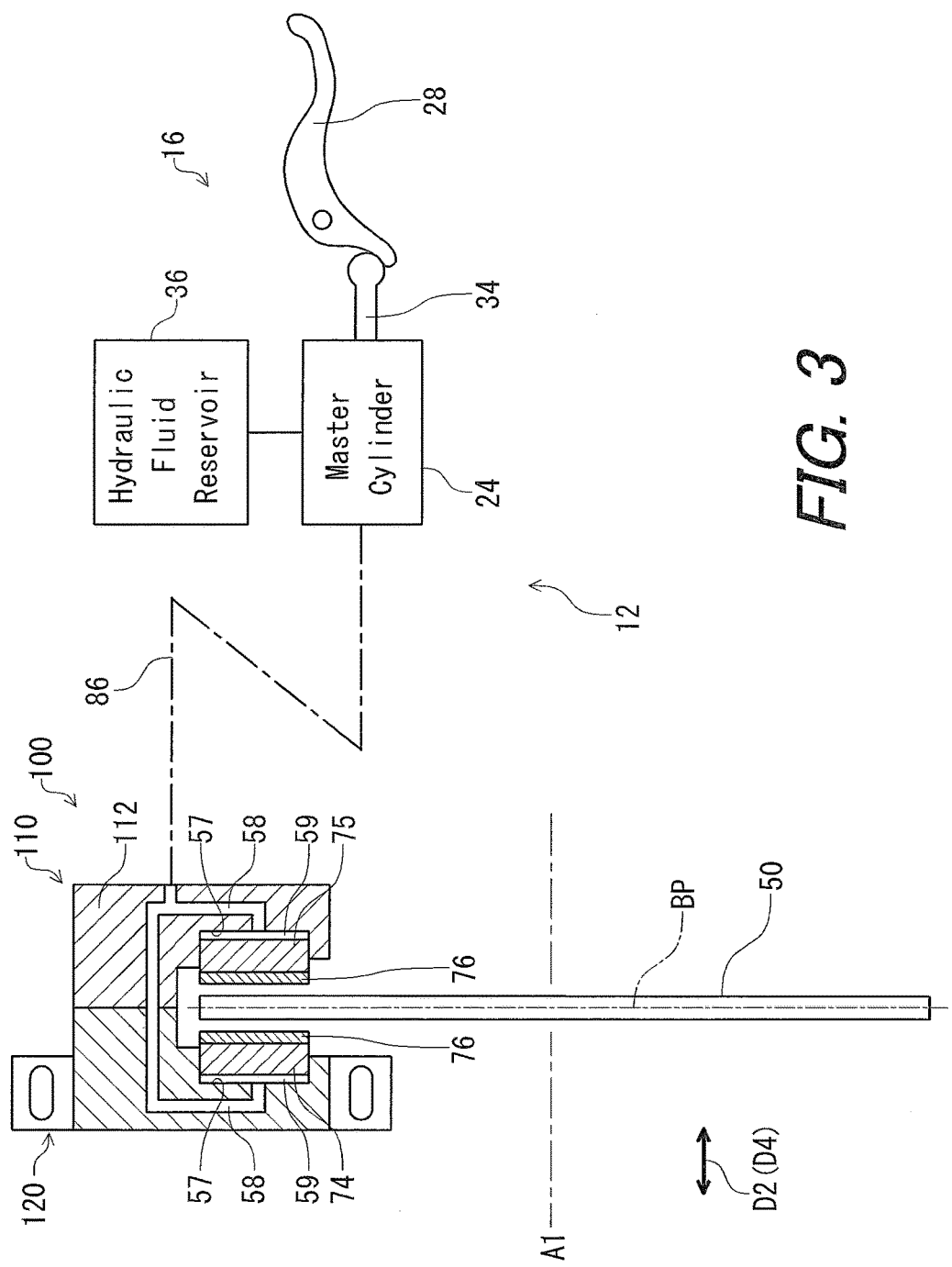
FIG. 3 is a schematic structural diagram of the disc brake device illustrated in FIG. 2.

Referring to FIG. 3, the disc brake caliper 110 is for applying a braking force on the brake disc rotor 50 configured to be rotatable about the rotational axis A1. The disc brake caliper 110 further comprises a housing 112, a first piston 74, a second piston 75, and a pair of brake pads 76. The brake pads 76 are biased by a biasing member (not shown) toward the first and second pistons 74 and 75. The first and second pistons 74 and 75 are arranged to press the brake pads 76 toward the brake disc rotor 50. The housing 112 includes a pair of cylinders 57, and a caliper fluid passage 58. The first piston 74 is configured to be movable in a movement direction D4. The second piston 75 is configured to be movable in the movement direction D4. The first and second pistons 74 and 75 are disposed within the cylinders 57 to be movable in an axial direction D2 of the brake disc rotor 50. The movement direction D4 is substantially parallel to the axial direction D2 in a state where the disc brake caliper 110 is mounted to the bicycle frame 14 (FIG. 2). The fluid chambers 59 are defined by the first and second pistons 74 and 75 and the cylinders 57. The fluid chambers 59 are in fluid communication with the caliper fluid passage 58. The caliper fluid passage 58 is in fluid communication with the master cylinder 24 via the hydraulic brake hose 86.

When the brake lever 28 is operated, the master piston 34 moves within the master cylinder 24 in response to the pivotal movement of the brake lever 28, which allows pressure fluid to move through the hydraulic brake hose 86 connected to the brake caliper 110. The pressure oil moves the first and second pistons 74 and 75 to press the brake pads 76 against the brake disc rotor 50, applying the braking force to the brake disc rotor 50.

Figure 4:
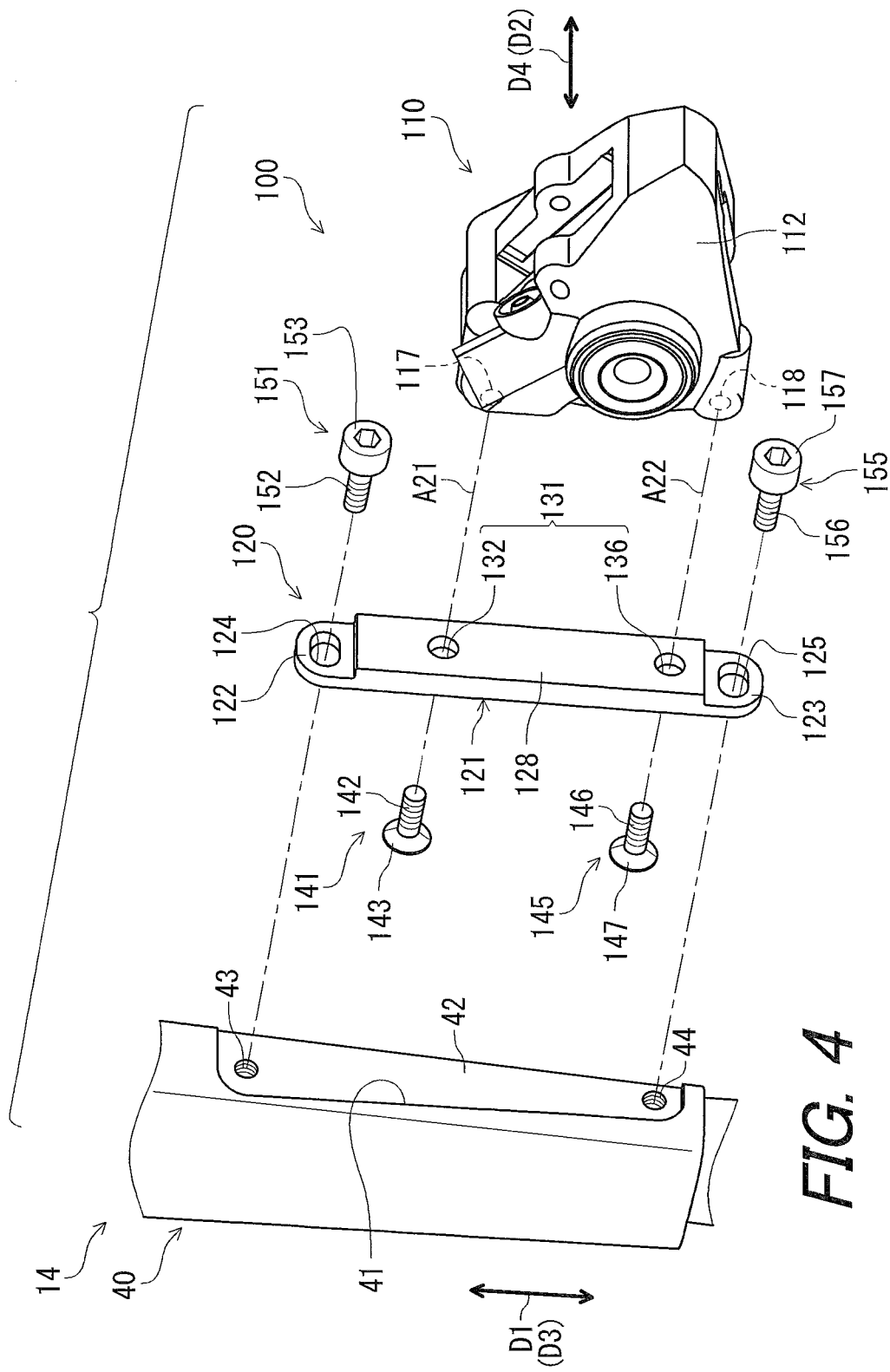
FIG. 4 is an exploded perspective view of the disc brake caliper assembly illustrated in FIG. 2 (first position)

Referring to FIG. 4, the bicycle brake caliper assembly 100 is configured to be attached to the pipe portion 40 of the bicycle frame 14. The disc brake caliper assembly 100 comprises the disc brake caliper 110, the base member 120, a first thread bolt 141, and a second thread bolt 145. In the brake caliper 110 depicted in FIG. 4, parts other than the housing 112 (e.g., the brake pads 76 and the first and second pistons 74 and 75) are omitted. The brake caliper 110 is coupled to the base member 120 by the first thread bolt 141 and the second thread bolt 145. The base member 120 is attached to the pipe portion 40 by the first attaching member 151 and the second attaching member 155. The brake caliper 110 and the base member 120 are made of metallic material such as aluminum alloy or iron. One of the first attaching member 151 and the second attaching member 155 can be omitted from the disc brake caliper 110 if needed and/or desired.

The base member 120 is configured to be coupled to the disc brake caliper 110 and to be attached to the pipe portion 40 of the bicycle frame 14. More specifically, the base member 120 is configured to be coupled to the brake caliper 110 and to be attached to the bicycle frame 14 (the pipe portion 40) such that relative position between the rotational axis A1 of the brake disc rotor 50 and the brake caliper 110 is adjustable in the radial direction D1 of the brake disc rotor 50.

The base member 120 extends in a longitudinal direction D3. The longitudinal direction D3 of the base member 120 is substantially parallel to the radial direction D1 of the brake disc rotor 50 in a state where the base member 120 is attached to the pipe portion 40 (FIG. 1). Namely, the base member 120 extends in the radial direction D1 in a state where the base member 120 is attached to the pipe portion 40.

The base member 120 includes a main body 121, a first end portion 122, and a second end portion 123. In the first embodiment, the main body 121, the first end portion 122, and the second end portion 123 are integrally provided as a one piece unitary member. The main body 121 has a plate shape and extends in the longitudinal direction D3 (in the radial direction D1). The first end portion 122 is opposite to the second end portion 123 with respect to the main body 121. The first end portion 122 is disposed at one end of the main body 121. The second end portion 123 is disposed at the other end of the main body 121. The base member 120 includes a first attaching through-hole 124 and a second attaching through-hole 125. The first attaching through-hole 124 is provided at the first end portion 122. The second attaching through-hole 125 is provided at the second end portion 123.

The base member 120 includes a caliper-side contact surface 128. The caliper-side contact surface 128 is flat and is provided on the main body 121. The caliper-side contact surface 128 is configured to contact the brake caliper 110 in a state where the base member 120 is coupled to the brake caliper 110.

The base member 120 further includes a coupling portion 131 at which the brake caliper 110 is coupled. The coupling portion 131 includes a first through-hole 132 and a second through-hole 136. The first through-hole 132 and the second through-hole 136 are provided on the main body 121. The second through-hole 136 is arranged apart from the first through-hole 132 in the radial direction D1 (in the longitudinal direction D3). The second attaching through-hole 125 is spaced apart from the first attaching through-hole 124 in the radial direction D1 (in the longitudinal direction D3). The first through-hole 132 and the second through-hole 136 are arranged between the first attaching through-hole 124 and the second attaching through-hole 125.

The first thread bolt 141 is configured to couple the brake caliper 110 to the base member 120. The second thread bolt 145 is configured to couple the brake caliper 110 to the base member 120. In FIG. 4, the first thread bolt 141 passes through the first through-hole 132 and the second thread bolt 145 passes through the second through-hole 136 in a state where the base member 120 is coupled to the brake caliper 110 with the first thread bolt 141 and the second thread bolt 145. The first thread bolt 141 is a countersunk head bolt and includes a first external thread 142 and a first countersunk head 143. The second thread bolt 145 is a countersunk head bolt and includes a second external thread 146 and a second countersunk head 147. In the first embodiment, the second thread bolt 145 has substantially the same shape as that of the first thread bolt 141. It should be understood that the second thread bolt 145 has a shape different from that of the first thread bolt 141.

In a state where the base member 120 is coupled to the brake caliper 110 with the first thread bolt 141 and the second thread bolt 145, the base member 120 is attached to an attachment portion 41 of the pipe portion 40 by the first attaching member 151 and the second attaching member 155.

The attachment portion 41 of the pipe portion 40 is recessed and includes a support surface 42, and threaded holes 43 and 44. The support surface 42 is configured to contact the base member 120. The threaded holes 43 and 44 are provided on the support surface 42. The base member 120 is disposed within the attachment portion 41 in a state where the base member 120 is attached to the pipe portion 40 with the first attaching member 151 and the second attaching member 155.

The first attaching member 151 is a hexagon socket head bolt and includes a first external thread 152 and a first hexagon socket head 153. In FIG. 4, the first external thread 152 is screwed in the threaded hole 43 through the first attaching through-hole 124, and the first end portion 122 of the base member 120 is secured to the attachment portion 41 of the pipe portion 40 with the first attaching member 151.

The second attaching member 155 is a hexagon socket head bolt and includes a second external thread 156 and a second hexagon socket head 157. In FIG. 4, the second external thread 156 is screwed in the threaded hole 44 through the second attaching through-hole 125, and the second end portion 123 of the base member 120 is secured to the attachment portion 41 of the pipe portion 40 with the second attaching member 155.

Figure 5:
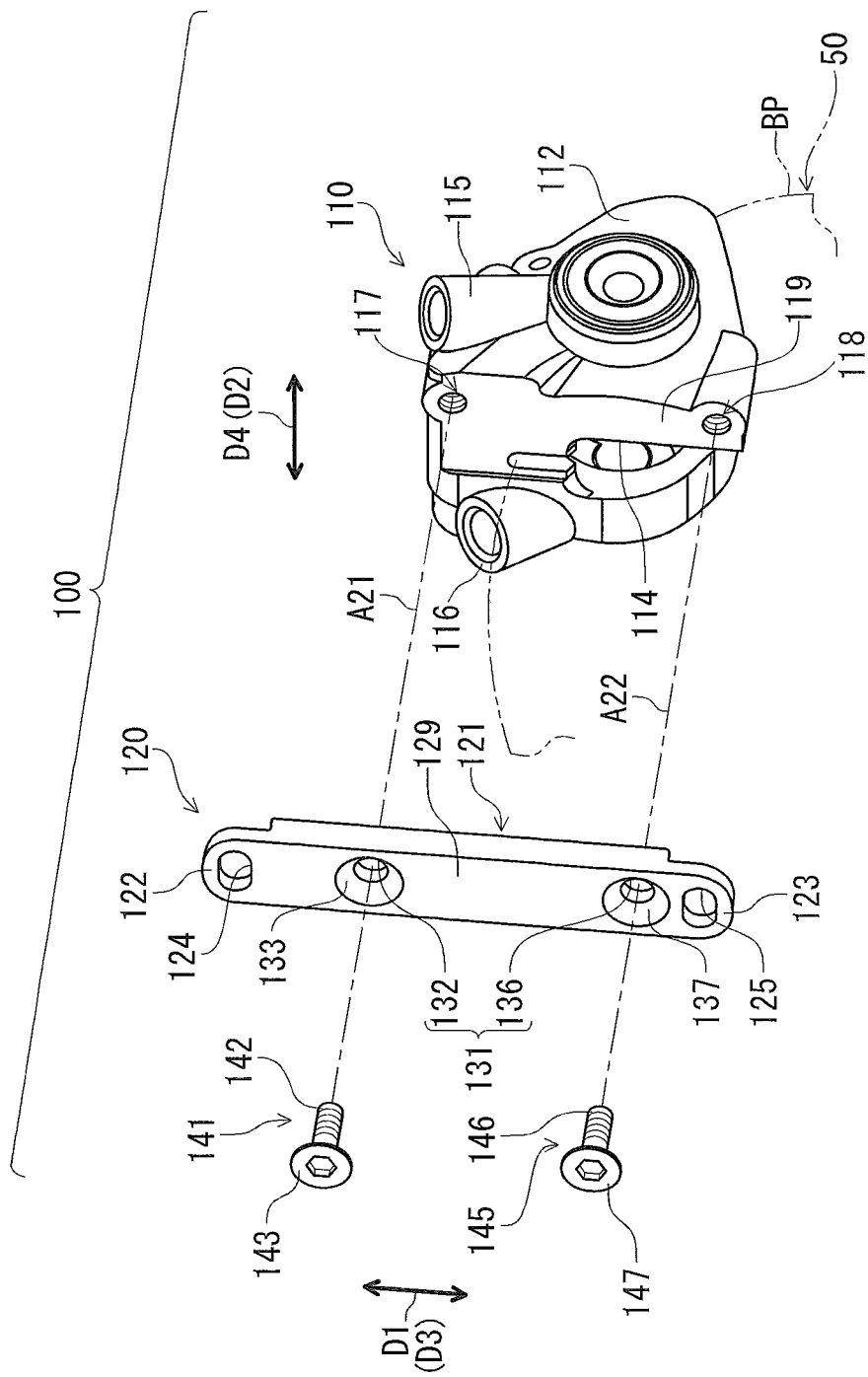
FIG. 5 is an exploded perspective view of the disc brake caliper assembly illustrated in FIG. 2 (first position)

Referring to FIG. 5, the housing 112 of the brake caliper 110 includes a connection port 115, a bleed port 116, a slit 114, and an attachment surface 119. Namely, the disc brake caliper 110 comprises the attachment surface 119. The connection port 115 and the bleed port 116 are in fluid communication with the caliper fluid passage 58 (FIG. 3). The hydraulic brake hose 86 is connected with the connection port 115 via the banjo 87 (FIG. 2). A bleed nipple (not shown) is coupled to the bleed port 116. The slit 114 extends such that an outer friction portion of the brake disc rotor is disposed in the slit 114. The attachment surface 119 is flat and is configured to be contact the caliper-side contact surface 128 (FIG. 4) of the base member 120 in a state where the brake caliper 110 is coupled to the base member 120.

The disc brake caliper 110 comprises a first threaded hole 117 in which the first thread bolt 141 is to be inserted so as to couple the disc brake caliper 110 to one of the bicycle frame 14 and the base member 120 attached to the bicycle frame 14. The first threaded hole 117 has a threaded portion that is at least partially provided at an internal circumferential surface of the first threaded hole 117 so as to engage with the first thread bolt 141. In the illustrated embodiment, the first thread bolt 141 is inserted in the first threaded hole 117 so as to couple the disc brake caliper 110 to the base member 120. The first thread bolt 141 is configured to be inserted in the first threaded hole 117 via the base member 120 so as to couple the base member 120 to the disc brake caliper 110.

The disc brake caliper 110 further comprises a second threaded hole 118 in which the second thread bolt 145 is to be inserted so as to couple the disc brake caliper 110 to one of the bicycle frame 14 and the base member 120. The second threaded hole 118 has a threaded portion that is at least partially provided at an internal circumferential surface of the second threaded hole 118 so as to engage with the second thread bolt 145. In the illustrated embodiment, the second thread bolt 145 is inserted in the second threaded hole 118 so as to couple the disc brake caliper 110 to the base member 120. The second thread bolt 145 is configured to be inserted in the second threaded hole 118 via the base member 120 so as to couple the base member 120 to the disc brake caliper 110. One of the first threaded hole 117 and the second threaded hole 118 can be omitted from the disc brake caliper 110 if needed and/or desired.

As seen in FIG. 5, the first threaded hole 117 is provided on the attachment surface 119 of the housing 112. The second threaded hole 118 is provided on the attachment surface 119 of the housing 112. In the illustrated embodiment, the attachment surface 119 comprises a single flat surface on which the first threaded hole 117 and the second threaded hole 118 are provided. The attachment surface 119 can, however, includes a plurality of surfaces separated from each other. In the illustrated embodiment, the first threaded hole 117 has a first inner diameter. The second threaded hole 118 has a second inner diameter equal to the first inner diameter. A distance between the first threaded hole 117 and the second threaded hole 118 is substantially the same as a distance between the first through-hole 132 and the second through-hole 136. In FIG. 5, the first external thread 142 of the first thread bolt 141 is screwed in the first threaded hole 117, and the second external thread 146 of the second thread bolt 145 is screwed in the second threaded hole 118.

The first threaded hole 117 has a first center axis A21. The second threaded hole 118 has a second center axis A22 parallel to the first center axis A21. The first center axis A21 is non-parallel to the movement direction D4. The first center axis A21 of the first threaded hole 117 is parallel to a braking plane BP (FIG. 3) which is perpendicular to the movement direction D4. The second center axis A22 of the second threaded hole 118 is parallel to the braking plane BP (FIG. 3). The braking plane BP can be defined based on a friction surface of the brake disc rotor 50, for example.

The second center axis A22 can be substantially parallel to the first center axis A21 if needed and/or desired. The second center axis A22 can be non-parallel to the first center axis A21 if needed and/or desired. At least one of the first center axis A21 and the second center axis A22 can be substantially parallel to the braking plane BP if needed and/or desired. At least one of the first center axis A21 and the second center axis A22 can be non-parallel to the braking plane BP if needed and/or desired.

The base member 120 includes a frame-side contact surface 129 disposed on a side opposite to the brake caliper 110 with respect to the base member 120. The frame-side contact surface 129 is flat and is provided on the main body 121, the first end portion 122, and the second end portion 123. The frame-side contact surface 129 is configured to contact the support surface 42 (FIG. 4) of the pipe portion 40 in a state where the base member 120 is attached to the pipe portion 40.

As seen in FIG. 5, the first through-hole 132 includes a first tapered surface 133 provided on the frame-side contact surface 129. The second through-hole 136 includes a second tapered surface 137 provided on the frame-side contact surface 129. In a state where the base member 120 is coupled to the brake caliper 110 with the first thread bolt 141, the first countersunk head 143 of the first thread bolt 141 contacts the first tapered surface 133 of the first through-hole 132 and is disposed within a space defined by the first tapered surface 133, preventing the first countersunk head 143 from protruding beyond the frame-side contact surface 129 toward the pipe portion 40. In a state where the base member 120 is coupled to the brake caliper 110 with the second thread bolt 145, the second countersunk head 147 of the second thread bolt 145 contacts the second tapered surface 137 of the second through-hole 136 and is disposed within a space defined by the second tapered surface 137, preventing the second countersunk head 147 from protruding beyond the frame-side contact surface 129 toward the pipe portion 40.

Figure 6A:
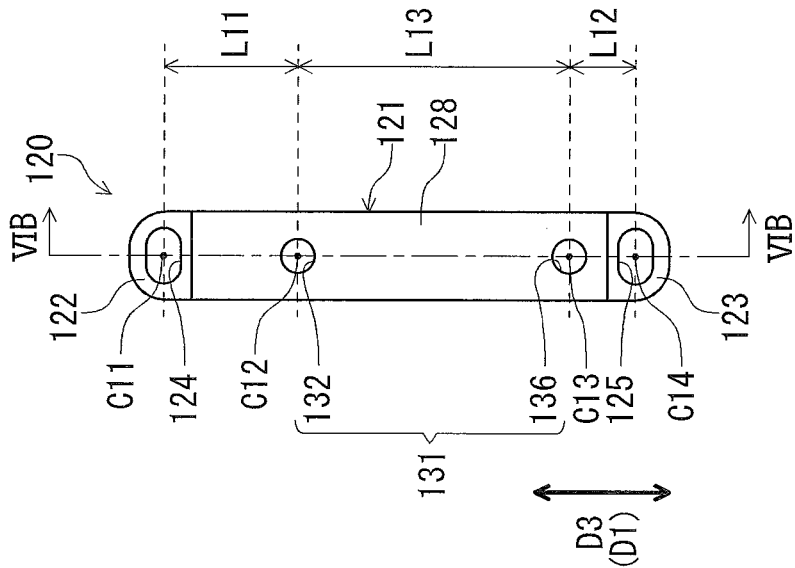
FIG. 6A is a back view of a base member illustrated in FIG. 5.
Figure 6B:
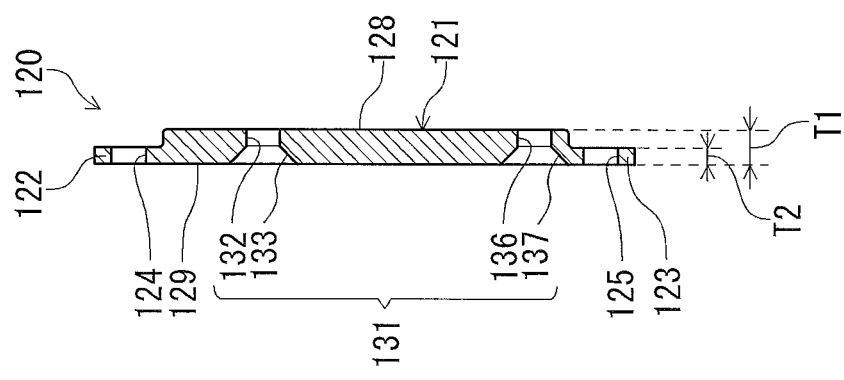
FIG. 6B is a partial cross sectional view of the base member taken along line VIB-VIB of FIG. 6C.

Referring to FIGS. 6A and 6B, the first through-hole 132 has substantially the same shape as that of the second through-hole 136. The first tapered surface 133 has substantially the same shape as that of the second tapered surface 137. The first tapered surface 133 is provided at an end portion of the first through-hole 132. The second tapered surface 137 is provided at an end portion of the second through-hole 136.

As seen in FIG. 6A, the first attaching through-hole 124 and the second attaching through-hole 125 extend in a transverse direction D5 of the base member 120. The transverse direction D5 is perpendicular to the longitudinal direction D3 of the base member 120 and is defined along the caliper-side contact surface 128 and the frame-side contact surface 129. The transverse direction D5 is substantially parallel to the axial direction D2 of the brake disc rotor 50 in a state where the base member 120 is attached to the pipe portion 40 of the bicycle frame 14. Namely, the first attaching through-hole 124 and the second attaching through-hole 125 extend in the axial direction D2 of the brake disc rotor 50 in a state where the base member 120 is attached to the bicycle frame 14. Since the first attaching through-hole 124 and the second attaching through-hole 125 extend in the axial direction D2, the relative position between the bicycle brake caliper assembly 100 and the brake disc rotor 50 is adjustable in the axial direction D2. It should be understood that the first attaching through-hole 124 and the second attaching through-hole 125 can be circular through-holes.

Referring to FIG. 6B, a thickness of the first end portion 122 is substantially the same as a thickness of the second end portion 123. A thickness T1 of the main body 121 is greater than a thickness T2 of the first end portion 122 and the second end portion 123.

Figure 6C:
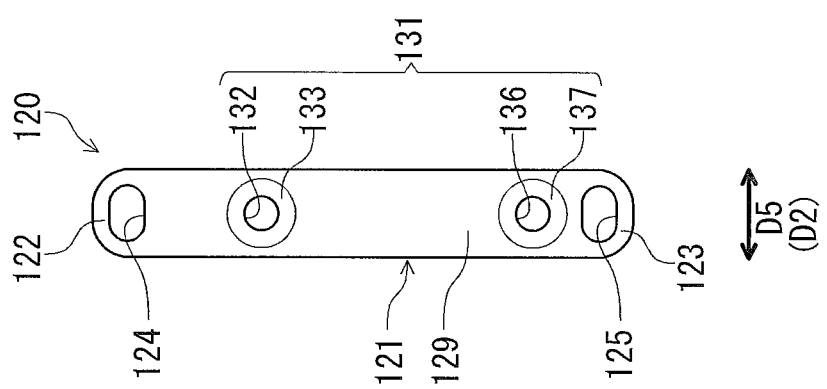
FIG. 6C is a front view of the base member illustrated in FIG. 5.

Referring to FIG. 6C, a distance L11 between a center C11 of the first attaching through-hole 124 and a center C12 of the first through-hole 132 is different from a distance L12 between a center C14 of the second attaching through-hole 125 and a center C13 of the second through-hole 136. More specifically, the distance L11 between the center C11 of the first attaching through-hole 124 and the center C12 of the first through-hole 132 is greater than the distance L12 between the center C14 of the second attaching through-hole 125 and the center C13 of the second through-hole 136. The distances L11 and L12 are smaller than a distance L13 between the center C12 of the first through-hole 132 and the center C13 of the second through-hole 136. Namely, the base member 120 has an asymmetrical shape in the longitudinal direction D3. Since the distance L11 is different from the distance L12, turning upside down the base member 120 can change a position of the coupling portion 131 in the radial direction D1.

Figure 7:
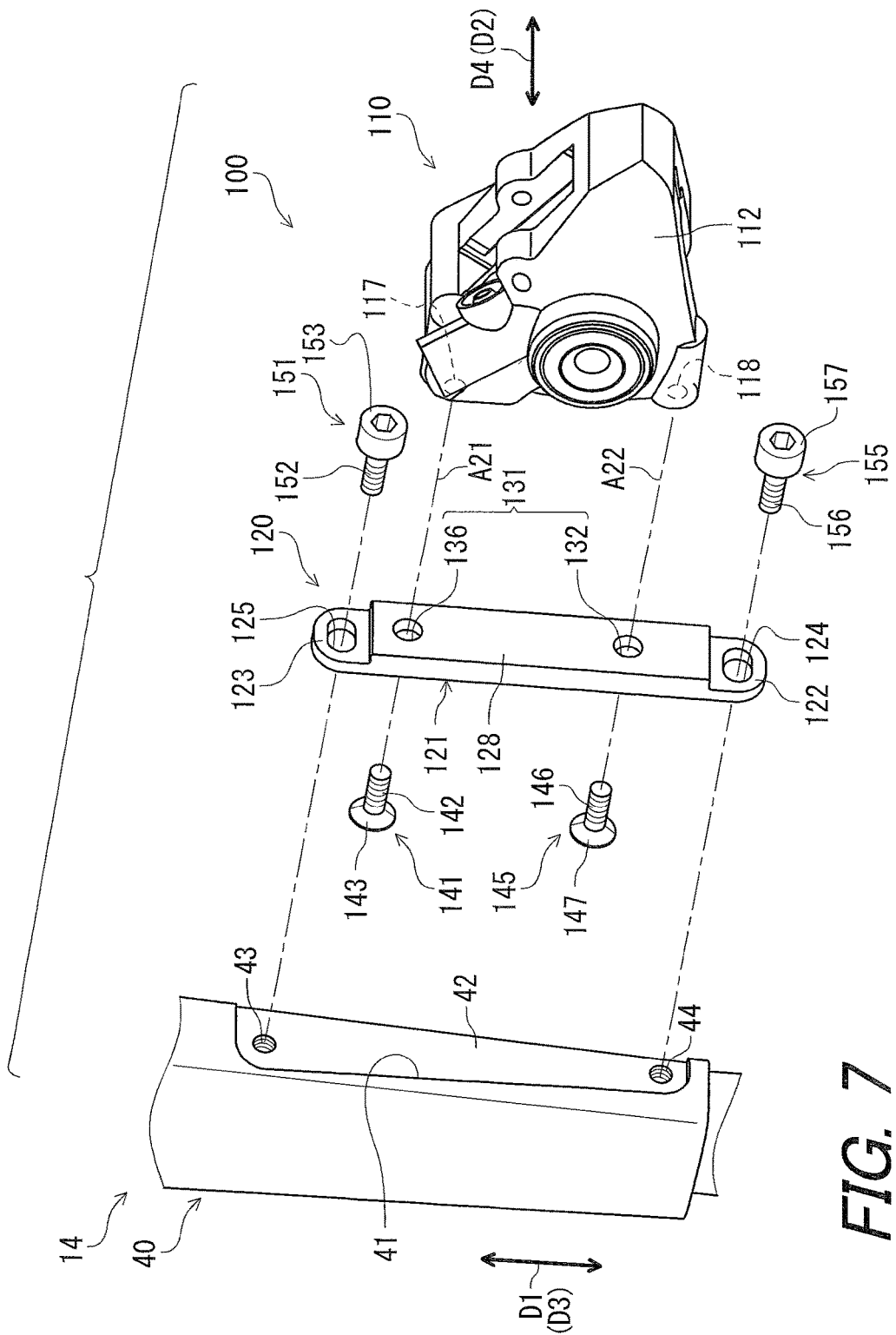
FIG. 7 is an exploded perspective view of the disc brake caliper assembly illustrated in FIG. 2 (second position)

Referring to FIGS. 4 and 7, the base member 120 is attached to the bicycle frame 14 with one of a first orientation and a second orientation. FIG. 4 illustrates the base member 120 that is disposed to be attached to the pipe portion 40 with the first orientation. FIG. 7 illustrates the base member 120 that is disposed to be attached to the pipe portion 40 with the second orientation.

As seen in FIG. 4, the first end portion 122 is disposed at an upper position and the second end portion 123 is disposed at a lower position in a state where the base member 120 is attached to the pipe portion 40 with the first orientation. As seen in FIG. 7, the second end portion 123 is disposed at an upper position and the first end portion 122 is disposed at a lower position in a state where the base member 120 is attached to the pipe portion 40 with the second orientation. Namely, the base member 120 disposed with the second orientation is upside-down in the radial direction D1 with respect to the base member 120 disposed with the first orientation.

As seen in FIG. 4, the first external thread 142 of the first thread bolt 141 is screwed in the first threaded hole 117 through the first through-hole 132 and the second external thread 146 of the second thread bolt 145 is screwed in the second threaded hole 118 through the second through-hole 136 in a state where the base member 120 is attached to the bicycle frame 14 with the first orientation. The first attaching member 151 passes through the first attaching through-hole 124 to attach the base member 120 to the bicycle frame 14. The second attaching member 155 passes through the second attaching through-hole 125 to attach the base member 120 to the bicycle frame 14. The first end portion 122 of the base member 120 is secured to the attachment portion 41 of the pipe portion 40 with the first attaching member 151 and the threaded hole 43. The second end portion 123 of the base member 120 is secured to the attachment portion 41 of the pipe portion 40 with the second attaching member 155 and the threaded hole 44.

As seen in FIG. 7, the first external thread 142 is screwed in the first threaded hole 117 through the second through-hole 136 and the second external thread 146 is screwed in the second threaded hole 118 through the first through-hole 132 in a state where the base member 120 is attached to the bicycle frame 14 with the second orientation. The first attaching member 151 passes through the second attaching through-hole 125 to attach the base member 120 to the bicycle frame 14. The second attaching member 155 passes through the first attaching through-hole 124 to attach the base member 120 to the bicycle frame 14. The second end portion 123 of the base member 120 is secured to the attachment portion 41 of the pipe portion 40 with the first attaching member 151 and the threaded hole 43. The first end portion 122 of the base member 120 is secured to the attachment portion 41 of the pipe portion 40 with the second attaching member 155 and the threaded hole 44.

FIG. 8A is a side elevational view of the bicycle brake caliper assembly 100 in a state where the base member 120 is attached to the pipe portion 40 with the first orientation. FIG. 8B is a side elevational view of the bicycle brake caliper assembly 100 in a state where the base member 120 is attached to the pipe portion 40 with the second orientation. FIG. 8A corresponds to FIG. 4, and FIG. 8B corresponds to FIG. 7.

Referring to FIGS. 8A and 8B, the bicycle brake caliper assembly 100 can be in two different states respectively corresponding to the brake disc rotor 50 and a brake disc rotor 55 which has an outer diameter R2 greater than an outer diameter R1 of the brake disc rotor 50. More specifically, the base member 120 is configured to be coupled to the brake caliper 110 and to be attached to the bicycle frame 14 (the pipe portion 40) such that relative position between the rotational axis A1 of the brake disc rotors 50 and 55 and the brake caliper 110 is adjustable in the radial direction D1 of the brake disc rotors 50 and 55. The base member 120 is configured such that a first position P11 of the coupling portion 131 in a state where the base member 120 is attached to the bicycle frame 14 with the first orientation differs from a second position P12 of the coupling portion 131 in a state where the base member 120 is attached to the bicycle frame 14 with the second orientation, in the radial direction D1. In the first embodiment, the first and second positions P11 and P12 are defined on the basis of the second center axis A22 of the second threaded hole 118, for example.

As seen in FIG. 8A, a first distance L17 is defined between the rotational axis A1 of the brake disc rotor 50 and the second center axis A22 of the second threaded hole 118 in the radial direction D1 in a state where the base member 120 is attached to the pipe portion 40 with the first orientation. As seen in FIG. 8B, a second distance L18 is defined between the rotational axis A1 of the brake disc rotor 55 and the second center axis A22 of the second threaded hole 118 in the radial direction D1 in a state where the base member 120 is attached to the pipe portion 40 with the second orientation. As seen in FIGS. 8A and 8B, the second distance L18 corresponding to the second orientation is greater than the first distance L17 corresponding to the first orientation. Accordingly, changing the orientation of the base member 120 relative to the pipe portion 40 and the brake caliper 110 allows the bicycle brake caliper assembly 100 to be adjusted to each of the brake disc rotors 50 and 55 having different outer diameters R1 and R2.

The base member 120 does not need to have the function which allows the disc brake caliper assembly 100 to be adjusted to each of the brake disc rotors 50 and 55 having different outer diameters R1 and R2. For example, in the base member 120 illustrated in FIG. 6C, the distance L11 between the centers C11 and C12 can be equal to the distance L12 between the centers C13 and C14. Furthermore, the base member 120 can be omitted from the disc brake caliper assembly 100 if needed and/or desired.

As seen in FIGS. 8A and 8B, the attachment surface 119 is configured to face the pipe portion 40 of the bicycle frame 14 in a state where the disc brake caliper 110 is coupled to the bicycle frame 14. The attachment surface 119 defines an end surface which faces the pipe portion 40 of the bicycle frame 14. The attachment surface 119 is disposed between the first piston 74 and the pipe portion 40 in a state where the disc brake caliper 110 is mounted to the pipe portion 40.

The first piston 74 is disposed between the first center axis A21 and the second center axis A22. The second piston 75 is disposed between the first center axis A21 and the second center axis A22 so as to at least partially face the first piston 74. The first piston 74 is disposed between the first center axis A21 and the second center axis A22 when viewed from the movement direction D4. The second piston 75 is disposed between the first center axis A21 and the second center axis A22 so as to at least partially face the first piston 74 when viewed from the movement direction D4.

The first center axis A21 is non-parallel to the rotational axis A1 in a state where the disc brake caliper 110 is mounted to the bicycle frame 14. The first center axis A21 of the first threaded hole 117 is parallel to the braking plane BP (FIGS. 3 and 5) which is perpendicular to the rotational axis A1, in a state where the disc brake caliper 110 is mounted to the bicycle frame 14. The second center axis A22 of the second threaded hole 118 is parallel to the braking plane BP (FIGS. 3 and 5), in a state where the disc brake caliper 110 is mounted to the bicycle frame 14.

As seen in FIGS. 8A and 8B, the first center axis A21 is non-parallel to the rotational axis A1 in a state where the disc brake caliper 110 is mounted to the pipe portion 40 of the bicycle frame 14. The second center axis A22 is non-parallel to the rotational axis A1 in a state where the disc brake caliper 110 is mounted to the pipe portion 40 of the bicycle frame 14.

Second Embodiment

A disc brake caliper assembly 200 in accordance with a second embodiment will be described below referring to FIGS. 9 to 13. Elements having substantially the same function as those in the first embodiment will be numbered the same here, and will not be described again in detail.

Figure 9:
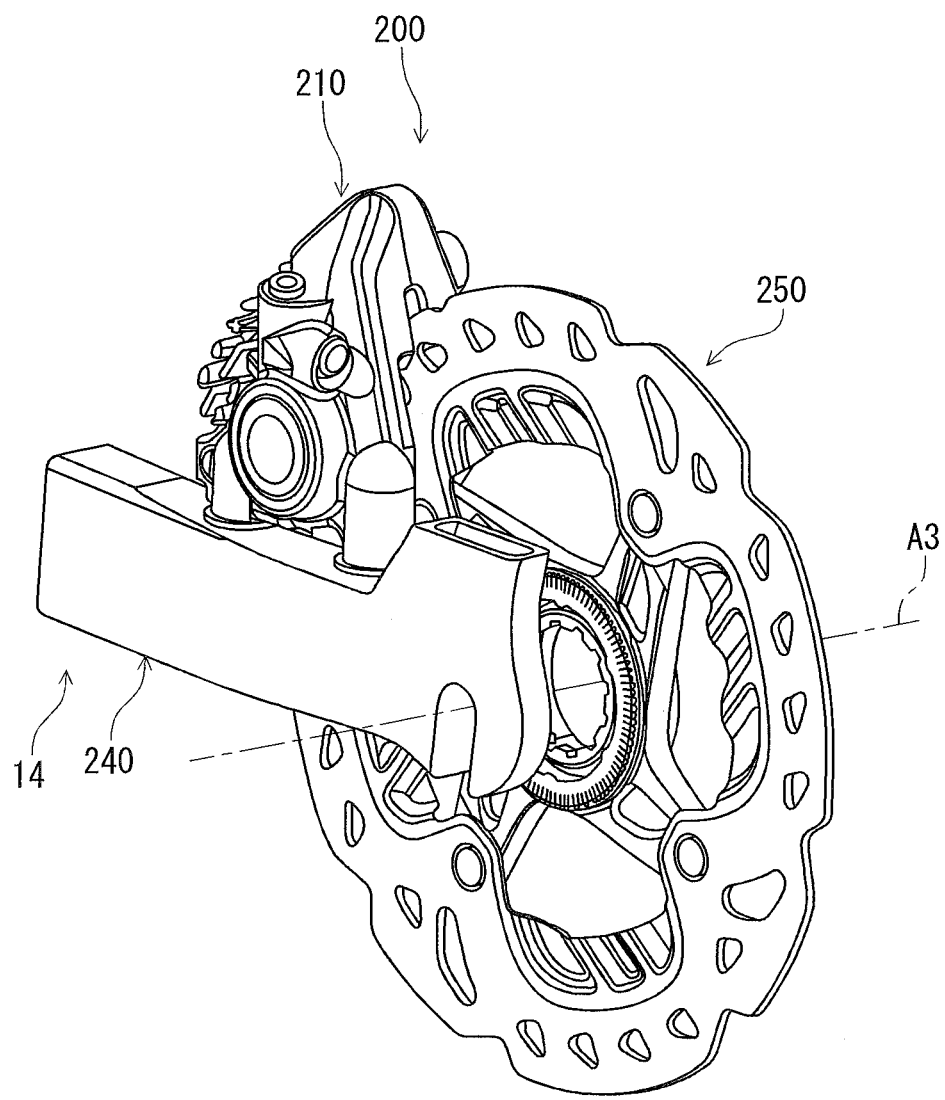
FIG. 9 is a perspective view of a disc brake caliper assembly in accordance with a second embodiment.

As seen in FIG. 9, the disc brake caliper assembly 200 is mounted to a pipe portion 240 of the bicycle frame 14. In the illustrated embodiment, since the disc brake caliper assembly 200 is applied to a rear disc brake system, the pipe portion 240 of the bicycle frame 14 is a chain stay of the main frame 13, for example.

The disc brake caliper assembly 200 comprises a disc brake caliper 210. Unlike the disc brake caliper 110 in accordance with the first embodiment, the base member 120 is omitted from the disc brake caliper assembly 200. The disc brake caliper 210 is directly mounted to the pipe portion 240 of the bicycle frame 14. An intermediate member such as the base member 120 can, however, be applied to the disc brake caliper 210 if needed and/or desired. The disc brake caliper 210 is for applying a braking force on a brake disc rotor 250 configured to be rotatable about a rotational axis A3. The brake disc rotor 250 is rotatably supported by a bicycle hub assembly. Since the bicycle hub assembly and other structures around the brake disc rotor 250 are well known in the bicycle field, they will not be described and/or illustrated in detail here for the sake of brevity.

Figure 10:
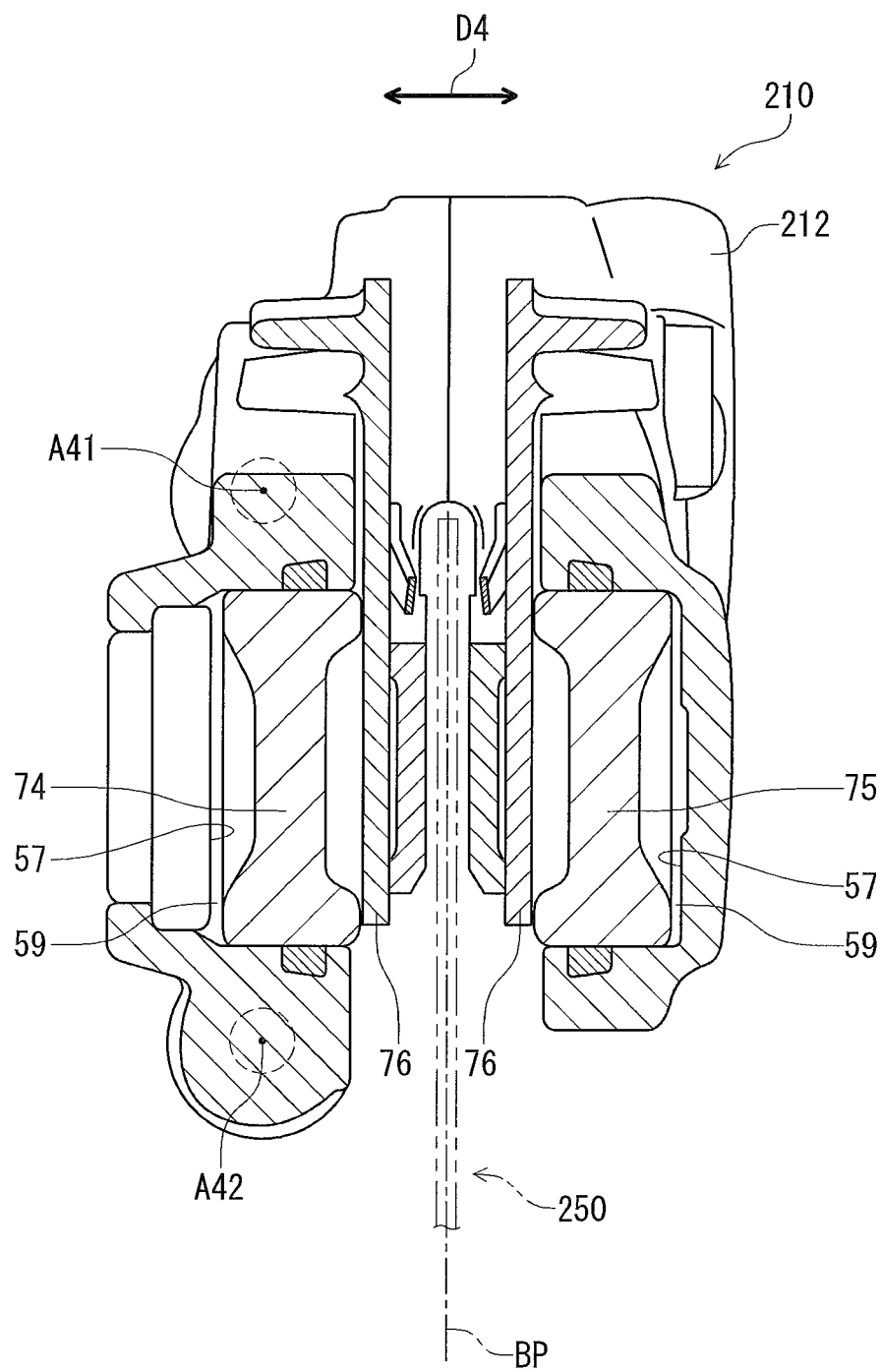
FIG. 10 is a cross-sectional view a disc brake caliper of the disc brake caliper assembly illustrated in FIG. 9.

As seen in FIG. 10, the disc brake caliper 210 comprises the first piston 74. The first piston 74 is configured to be movable in the movement direction D4. The disc brake caliper 210 further comprises the second piston 75. The second piston 75 is configured to be movable in the movement direction D4. The first piston 74 and the second piston 75 are provided in a housing 212 of the disc brake caliper 210.

Figure 11:
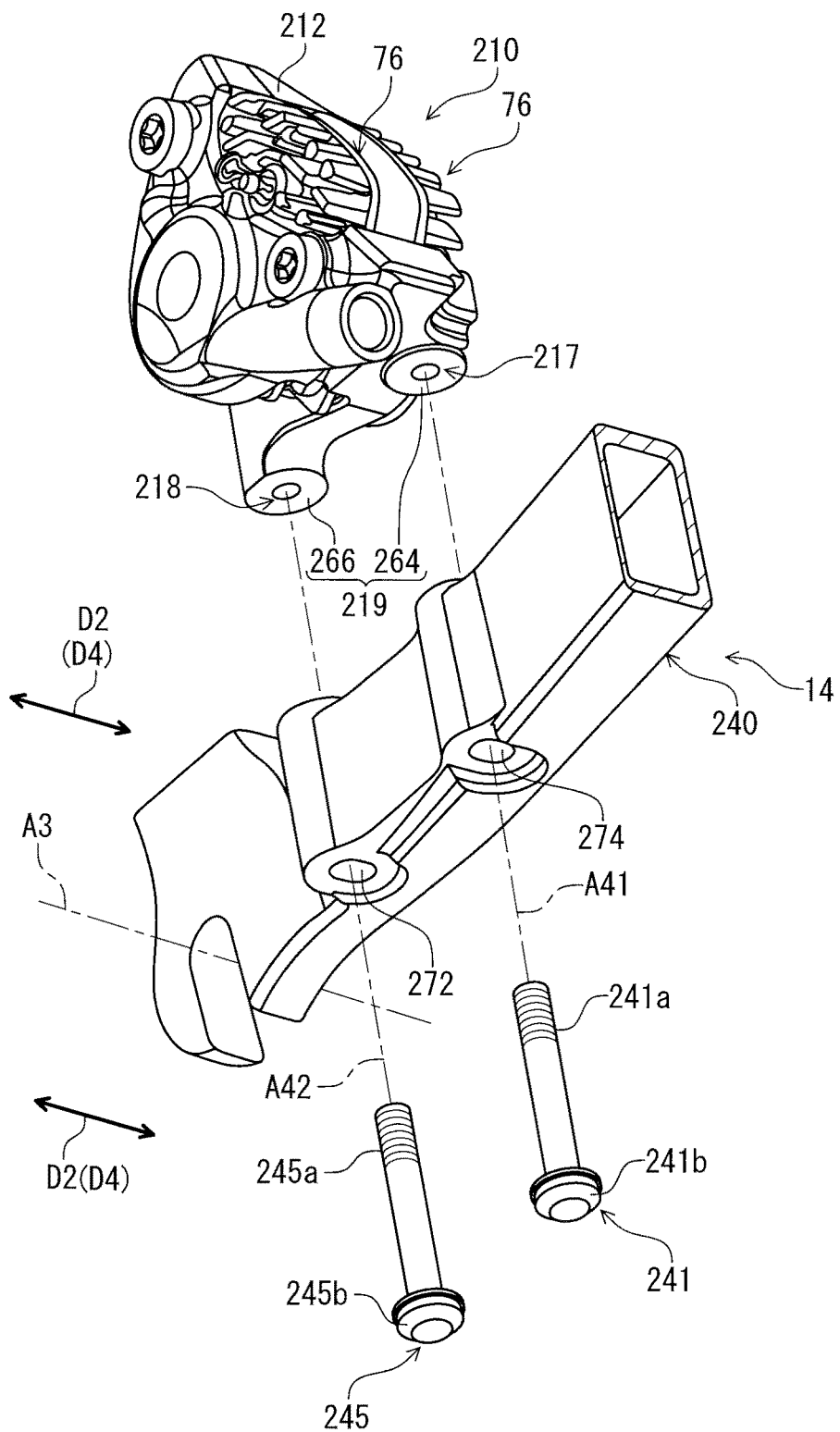
FIG. 11 is an exploded perspective view of the disc brake caliper assembly illustrated in FIG. 9.

As seen in FIG. 11, the disc brake caliper 210 comprises an attachment surface 219 and a first threaded hole 217. The attachment surface 219 and the first threaded hole 217 are provided on the housing 212. The attachment surface 219 is configured to face the pipe portion 240 of the bicycle frame 14 in a state where the disc brake caliper 210 is coupled to the bicycle frame 14. The first threaded hole 217 is provided on the attachment surface 219. In the illustrated embodiment, the attachment surface 219 is configured to contact the pipe portion 240 in a state where the disc brake caliper 210 is coupled to the bicycle frame 14.

The disc brake caliper assembly 200 further includes a first thread bolt 241. The first thread bolt 241 is to be inserted in the first threaded hole 217 so as to couple the disc brake caliper 210 to one of the bicycle frame 14 and a base member attached to the bicycle frame 14. In the illustrated embodiment, the first thread bolt 241 is inserted in the first threaded hole 217 so as to couple the disc brake caliper 210 to the bicycle frame 14.

As seen in FIG. 11, the disc brake caliper 210 further comprises a second threaded hole 218 and a second thread bolt 245. The second threaded hole 218 is provided on the housing 212. More specifically, the second threaded hole 218 is provided on the attachment surface 219 of the housing 212. The second thread bolt 245 is to be inserted so as to couple the disc brake caliper 210 to one of the bicycle frame 14 and a base member. In the illustrated embodiment, the second thread bolt 245 is inserted so as to couple the disc brake caliper 210 to the bicycle frame 14. In the illustrated embodiment, the second thread bolt 245 has substantially the same shape as that of the first thread bolt 241. The second thread bolt 245 can, however, have a shape different from a shape of the first thread bolt 241 if needed and/or desired.

The first threaded hole 217 has a first inner diameter. The second threaded hole 218 has a second inner diameter equal to the first inner diameter. The second inner diameter of the second threaded hole 218 can be different from the first inner diameter of the first threaded hole 217 if needed and/or desired.

The first thread bolt 241 includes a first external thread 241a and a first head part 241b. The first external thread 241a is screwed in the first threaded hole 217. The second thread bolt 245 includes a second external thread 245a and a second head part 245b. The second external thread 245a is screwed in the second threaded hole 218.

As seen in FIG. 11, the first threaded hole 217 has a first center axis A41. The first center axis A41 is non-parallel to the movement direction D4. The first center axis A41 is non-parallel to the rotational axis A3 in a state where the disc brake caliper 210 is mounted to the bicycle frame 14 (more specifically, to the pipe portion 240 of the bicycle frame 14). The second threaded hole 218 has a second center axis A42 parallel to the first center axis A41. The second center axis A42 is non-parallel to the movement direction D4. The second center axis A42 is non-parallel to the rotational axis A3 in a state where the disc brake caliper 210 is mounted to the bicycle frame 14 (more specifically, to the pipe portion 240 of the bicycle frame 14).

As seen in FIG. 10, the first center axis A41 of the first threaded hole 217 is parallel to the braking plane BP which is perpendicular to the movement direction D4. The first center axis A41 of the first threaded hole 217 is parallel to the braking plane BP which is perpendicular to the rotational axis A3, in a state where the disc brake caliper 210 is mounted to the bicycle frame 14.

The second center axis A42 of the second threaded hole 218 is parallel to the braking plane BP which is perpendicular to the movement direction D4. The second center axis A42 of the second threaded hole 218 is parallel to the braking plane BP, in a state where the disc brake caliper 210 is mounted to the bicycle frame 14.

As seen in FIG. 11, the attachment surface 219 comprises a first portion 264 and a second portion 266 divided from the first portion 264. In the illustrated embodiment, the first portion 264 is spaced apart from the second portion 266. The first threaded hole 217 is provided on the first portion 264 of the attachment surface 219. The second threaded hole 218 is provided on the second portion 266 of the attachment surface 219.

Figure 12:
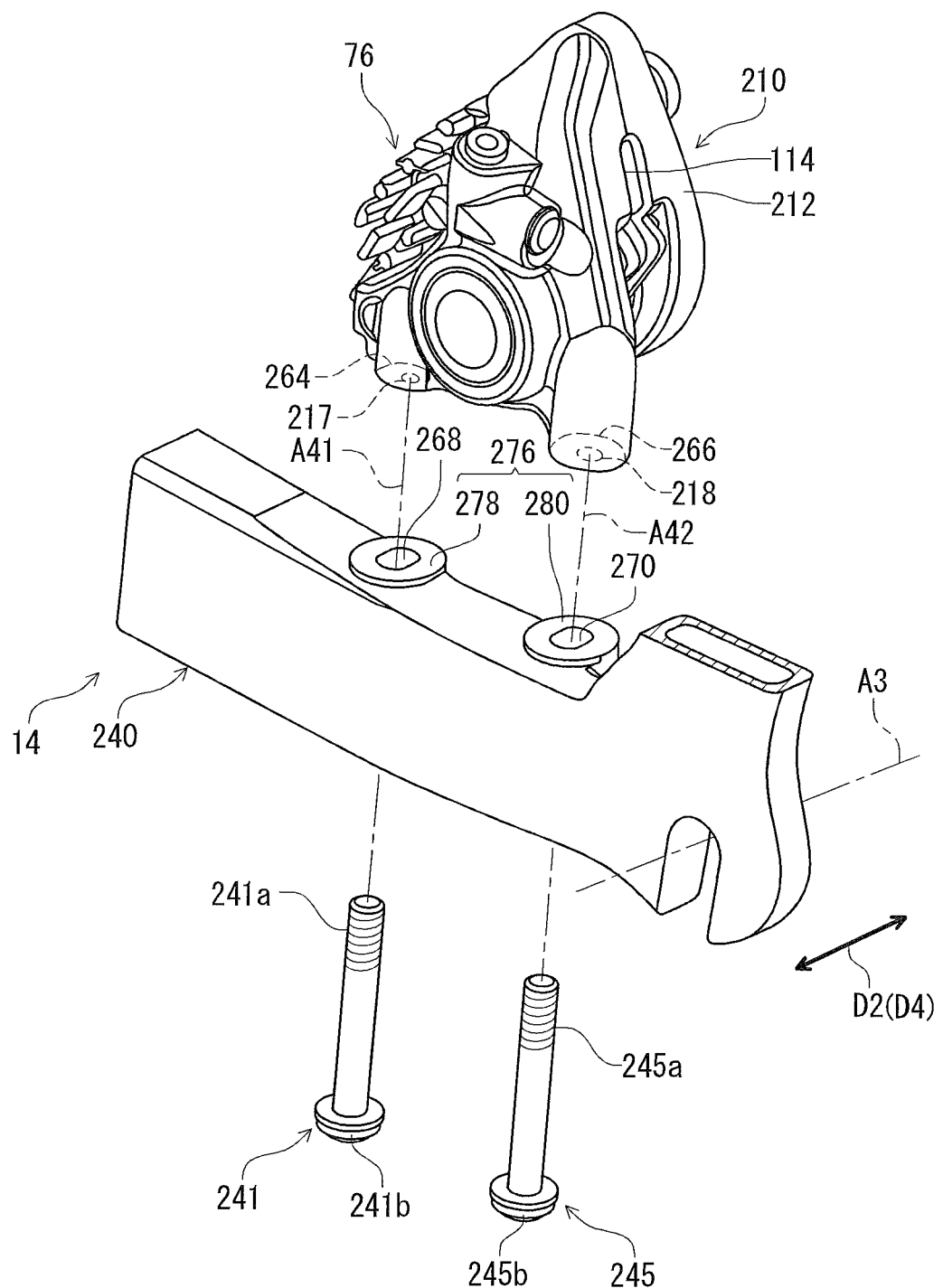
FIG. 12 is an exploded perspective view of the disc brake caliper assembly illustrated in FIG. 9.

As seen in FIG. 12, the pipe portion 240 includes a first attachment hole 268 and a second attachment hole 270. The first thread bolt 241 extends through the first attachment hole 268 in a state where the disc brake caliper 210 is mounted to the pipe portion 240. The second thread bolt 245 extends through the second attachment hole 270 in a state where the disc brake caliper 210 is mounted to the pipe portion 240. In the illustrated embodiment, each of the first attachment hole 268 and the second attachment hole 270 is an elongated hole extending in the axial direction D2.

As seen in FIG. 11, the pipe portion 240 includes a third attachment hole 274 and a fourth attachment hole 272. The first thread bolt 241 extends through the third attachment hole 274 in a state where the disc brake caliper 210 is mounted to the pipe portion 240. The second thread bolt 245 extends through the fourth attachment hole 272 in a state where the disc brake caliper 210 is mounted to the pipe portion 240. In the illustrated embodiment, each of the third attachment hole 274 and the fourth attachment hole 272 is an elongated hole extending in the axial direction D2.

As seen in FIG. 12, the pipe portion 240 includes a support surface 276. In the illustrated embodiment, the support surface 276 includes a first support surface 278 and a second support surface 280. The second support surface 280 is spaced apart from the first support surface 278. The first attachment hole 268 is provided on the first support surface 278. The second attachment hole 270 is provided on the second support surface 280.

The first support surface 278 is configured to face the first portion 264 of the attachment surface 219. The second support surface 280 is configured to face the second portion 266 of the attachment surface 219. In the illustrated embodiment, the first support surface 278 is configured to contact the first portion 264 of the attachment surface 219. The second support surface 280 is configured to contact the second portion 266 of the attachment surface 219.

Figure 13:
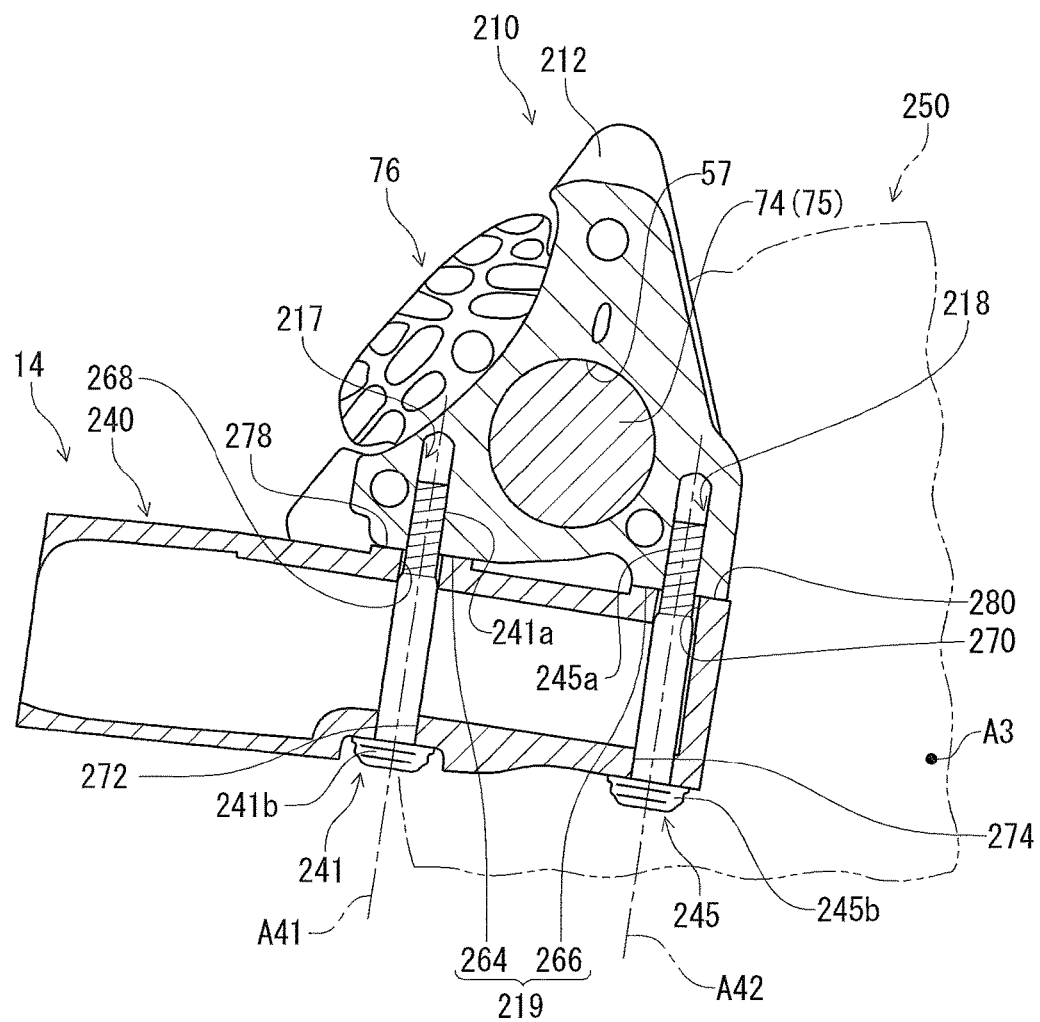
FIG. 13 is a cross-sectional view the disc brake caliper illustrated in FIG. 9.

As seen in FIG. 13, the attachment surface 219 defines an end surface which faces the pipe portion 240 of the bicycle frame 14. The attachment surface 219 is disposed between the first piston 74 and the pipe portion 240 in a state where the disc caliper 210 is mounted to the pipe portion 240.

The first piston 74 is disposed between the first center axis A41 and the second center axis A42. The second piston 75 is disposed between the first center axis A41 and the second center axis A42 so as to at least partially face the first piston 74. In the illustrated embodiment, the first piston 74 is disposed between the first center axis A41 and the second center axis A42 when viewed from the movement direction D4. The second piston 75 is disposed between the first center axis A41 and the second center axis A42 so as to at least partially face the first piston 74 when viewed from the movement direction D4.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A disc brake caliper for applying a braking force on a brake disc rotor configured to be rotatable about a rotational axis, the disc brake caliper comprising:
   a first piston configured to be movable in a movement direction;
   an attachment surface configured to face a pipe portion of a bicycle frame in a state where the disc brake caliper is coupled to the bicycle frame; and
   a first threaded hole in which a first thread bolt is to be inserted so as to couple the disc brake caliper to one of the bicycle frame and a base member attached to the bicycle frame, the first threaded hole being provided on the attachment surface, the first threaded hole having a first center axis,
   wherein the first threaded hole has a depth such that, when viewed in a direction parallel to the movement direction, a piston center axis is offset by a distance from the first threaded hole in a direction parallel to the first center axis.

2. The disc brake caliper according to claim 1, wherein the first threaded hole has a first center axis which is non-parallel to the rotational axis in a state where the disc brake caliper is mounted to the bicycle frame.

3. The disc brake caliper according to claim 2, wherein the first center axis is parallel to a braking plane which is perpendicular to the rotational axis in a state where the disc brake caliper is mounted to the bicycle frame.

4. The disc brake caliper according to claim 1, further comprising:
   a second threaded hole in which a second thread bolt is to be inserted so as to couple the disc brake caliper to one of the bicycle frame and the base member, the second threaded hole being provided on the attachment surface.

5. The disc brake caliper according to claim 4, wherein the attachment surface defines an end surface which faces the pipe portion of the bicycle frame.

6. The disc brake caliper according to claim 4, wherein the attachment surface comprises a single flat surface on which the first threaded hole and the second threaded hole are provided.

7. The disc brake caliper according to claim 4, wherein the attachment surface comprises a first portion and a second portion divided from the first portion, and
   the first threaded hole is provided on the first portion of the attachment surface and the second threaded hole is provided on the second portion of the attachment surface.

8. The disc brake caliper according to claim 4, wherein the first threaded hole has a first inner diameter, and
   the second threaded hole has a second inner diameter equal to the first inner diameter.

9. The disc brake caliper according to claim 4, wherein the first threaded hole has a first center axis which is non-parallel to the rotational axis in a state where the disc brake caliper is mounted to the pipe portion of the bicycle frame.

10. The disc brake caliper according to claim 9, wherein the first center axis is parallel to a braking plane which is perpendicular to the rotational axis in a state where the disc brake caliper is mounted to the bicycle frame.

11. The disc brake caliper according to claim 10, wherein the second threaded hole has a second center axis parallel to the first center axis.

12. The disc brake caliper according to claim 4, further comprising:
    a first piston, wherein
    the first threaded hole has a first center axis,
    the second threaded hole has a second center axis, and
    the first piston is disposed between the first center axis and the second center axis.

13. The disc brake caliper according to claim 12, further comprising:
    a second piston disposed between the first center axis and the second center axis so as to at least partially face the first piston.

14. The disc brake caliper according to claim 13, wherein the first center axis is non-parallel to the rotational axis in a state where the disc brake caliper is mounted to the pipe portion of the bicycle frame.

15. The disc brake caliper according to claim 14, wherein the first center axis is parallel to a braking plane which is perpendicular to the rotational axis in a state where the disc brake caliper is mounted to the bicycle frame.

16. The disc brake caliper according to claim 15, wherein the second center axis is parallel to the first center axis.

17. A disc brake caliper comprising:
    a first piston configured to be movable in a movement direction; and
    a first threaded hole in which a first thread bolt is to be inserted so as to couple the disc brake caliper to one of a bicycle frame and a base member attached to the bicycle frame, the first threaded hole having a first center axis non-parallel to the movement direction,
    wherein the first threaded hole has a depth such that, when viewed in a direction parallel to the movement direction, a piston center axis is offset by a distance from the first threaded hole in a direction parallel to the first center axis.

18. The disc brake caliper according to claim 17, wherein the first center axis is parallel to a braking plane which is perpendicular to the movement direction.

19. The disc brake caliper according to claim 17, further comprising:
    a second threaded hole in which a second thread bolt is to be inserted so as to couple the disc brake caliper to one of the bicycle frame and the base member, the second threaded hole having a second center axis non-parallel to the movement direction.

20. The disc brake caliper according to claim 19, wherein the first threaded hole has a first inner diameter, and
    the second threaded hole has a second inner diameter equal to the first inner diameter.

21. The disc brake caliper according to claim 19, wherein the first piston is disposed between the first center axis and the second center axis.

22. The disc brake caliper according to claim 21, further comprising:
    a second piston configured to be movable in the movement direction and disposed between the first center axis and the second center axis so as to at least partially face the first piston.

23. The disc brake caliper according to claim 22, wherein the first center axis is parallel to a braking plane which is perpendicular to the movement direction.

24. The disc brake caliper according to claim 23, wherein the second center axis is parallel to the first center axis.

25. A disc brake caliper assembly comprising:
the disc brake caliper according to claim 1 or 17;
the base member configured to be coupled to the disc brake caliper and to be attached to the bicycle frame; and
the first thread bolt configured to be inserted to the first threaded hole via the base member so as to couple the base member to the disc brake caliper.

* * * * *